United States Patent [19]

Reischl et al.

[11] 4,193,832

[45] Mar. 18, 1980

[54] METHOD FOR MAKING BONDS

[75] Inventors: Artur Reischl, Leverkusen; Rudolf Hombach, Cologne; Manfred Dollhausen, Odenthal, all of Fed. Rep. of Germany

[73] Assignee: Bayer Aktiengesellschaft, Leverkusen, Fed. Rep. of Germany

[21] Appl. No.: 899,430

[22] Filed: Apr. 24, 1978

[30] Foreign Application Priority Data

May 3, 1977 [DE] Fed. Rep. of Germany ....... 2719720

[51] Int. Cl.$^2$ ................................................ C09J 5/00
[52] U.S. Cl. ............................. 156/331; 260/33.44 R; 428/423.1; 528/67; 525/458
[58] Field of Search ........................ 156/331; 428/424; 260/858, 33.44 R; 528/67

[56] References Cited

U.S. PATENT DOCUMENTS

| | | | |
|---|---|---|---|
| 3,218,215 | 11/1965 | Achterhof et al. | 156/331 |
| 3,522,218 | 7/1970 | Pedain et al. | 260/858 |
| 3,523,093 | 8/1970 | Stamberger | 260/33.44 R |
| 3,770,555 | 11/1973 | Gladstone et al. | 156/331 |
| 4,089,835 | 5/1978 | König et al. | 260/858 |
| 4,092,275 | 5/1978 | Reischl et al. | 521/137 |
| 4,093,569 | 6/1978 | Reischl et al. | 260/33.44 R |
| 4,147,680 | 4/1979 | Reischl et al. | 260/33.44 R |

FOREIGN PATENT DOCUMENTS 1408510 10/1975 United Kingdom .

*Primary Examiner*—John T. Goolkasian
*Assistant Examiner*—J. J. Gallagher
*Attorney, Agent, or Firm*—Gene Harsh; Joseph C. Gil; R. Brent Olson

[57] ABSTRACT

The instant invention is directed to a method for bonding one or more substrates by applying adhesives comprising organic polyisocyanates and compounds containing isocyanate-reactive hydrogen atoms which react to form polyurethanes, or moisture-hardening reaction products containing free isocyanate groups or excess quantities of polyisocyanates and compounds containing isocyanate-reactive hydrogen atoms, the improvement wherein said compounds containing isocyanate-reactive hydrogen atoms are dispersions of polymers in organic polyhydroxyl compounds.

14 Claims, No Drawings

METHOD FOR MAKING BONDS

BACKGROUND OF THE INVENTION

The procedure of mixed adhesives based on organic polyhydroxyl compounds and polyisocyanates is known (see for example British Pat. No. 1,408,510). One disadvantage of these types of adhesives is that, in order to obtain high cohesion strengths and thermal stability under load, it is necessary to use polyols and polyisocyanates having a high degree of branching. These products give adhesive films of limited flexibility and are therefore unsuitable for bonding flexible materials such as rubber or plastics. The addition of a plasticizer reduces the strength of cohesion. Although flexible adhesive films may be produced from polyols and polyisocyanates having a low degree of branching, the strength of cohesion thereof is very low. It has not been possible to satisfactorily obtain the requisite properties of flexible mixed adhesives by adding conventional inorganic or organic pigments.

It has now surprisingly been found that flexible bonds having outstanding cohesive strengths may be made on the known principle of two-component polyurethane adhesives, which contain a reaction mixture reacting to form polyurethane as an essential constituent, providing certain dispersions of polymers in organic hydroxyl compounds which will be more fully described below are used instead of the conventional polyhydroxyl compounds of polyurethane chemistry as reactants for the polyisocyanates. It has also been found that, by using these dispersions of polymers in polyhydroxyl compounds, it is also possible to make bonds based on isocyanate prepolymers which harden under the influence of moisture and which in turn may be obtained by reacting the above-mentioned dispersions with an excess of organic polyisocyanates.

DESCRIPTION OF THE INVENTION

The present invention relates to a method for making bonds on any substrates using adhesives based on organic polyisocyanates and compounds containing isocyanate-reactive hydrogen atoms and, optionally, the conventional auxiliaries and additives, the adhesives being or containing either mixtures which react to form polyurethanes or moisture-hardening reaction products containing free isocyanate groups of excess quantities of polyisocyanates and polyhydroxyl compounds, characterized in that dispersions of polymers, optionally containing isocyanate-reactive hydrogen atoms, in organic polyhydroxyl compounds are used as the organic polyhydroxyl compounds.

The polyhydroxyl component is a dispersion of a polymer or polymers in organic polyhydroxyl compounds. The possibility opened up by the present invention of making elastic bonds of high cohesive strength is primarily attributable to the fact that the dispersions essential to the present invention contain both an elasticizing component and also a component of hard segments which is responsible for cohesion. In general, the polyhydroxyl compound represents the elasticizing component, while the dispersed polymer represents the component containing hard segments which is responsible for the strength of cohesion. However, the opposite case, i.e. the case where the disperse phase is responsible for the elasticity of the bonds and the polyhydroxyl compound, as the continuous phase, for the cohesive strength of the bonds, is also possible, although less preferred in practice.

The polyhydroxyl compounds which form the continuous phase in the dispersions have a molecular weight of from 200 to 4000, preferably from 400 to 2500, or mixtures of different polyhydroxyl compounds having an average molecular weight of from 200 to 4000, preferably from 400 to 2500. Individual components of the mixtures may have a molecular weight of from 62 to 20,000.

The following are examples of suitable polyhydroxyl compounds:

(1) simple polyhydric alcohols, such as ethylene glycol, 1,2-propane diol, hexamethylene glycol, glycerol or trimethylol propane;

(2) polyhydric alcohols containing ester groups of the type which may be obtained in known manner by reacting dicarboxylic acids, such as adipic acid, phthalic acid, maleic acid, tetrahydrophthalic acid or hexahydrophthalic acid, with excess quantities of alcohols, such as those mentioned above in (1);

(3) the polyether polyols known in polyurethane chemistry, of the type which may be obtained in known manner by the alkoxylation of suitable starter molecules. In addition to water, suitable starter molecules would be, for example, the simple alcohols mentioned above in (1); suitable alkoxylating agents would be ethylene oxide and/or propylene oxide;

(4) natural oils containing hydroxyl groups, such as, in particular, castor oil.

In general, the polyhydroxyl compound represents the elasticizing component. This means that either diols or diol mixtures or more highly functional polyols or polyol mixtures which only give rise to slight branching are used as the continuous phase. This means that where triols or, rather, polyol mixtures having an average OH-functionality of three or more than three, are used, they should have an average molecular weight of at least 600.

In addition to the polyhydroxyl compounds exemplified above, any other polyhydroxyl compounds known in polyurethane chemistry, for example those containing acetal, amide or urethane groups, may, of course, also be used as the continuous phase.

The polymers dispersed in the polyhydroxyl compounds are polyaddition or polycondensation products. The dispersions essential to the present invention generally have solids contents of from 3 to 60%, by weight, preferably from 10 to 50%, by weight, based on the dispersion as a whole.

Preferred polymers include polyisocyanate-polyaddition products, particularly polyaddition products of low molecular weight units which contain terminal hydroxyl groups and primary or secondary amino groups or semicarbazide groups. "Low molecular weight" units in the present context are, in particular, diisocyanates having a molecular weight of from 112 to 300 and compounds containing isocyanate-reactive groups having a functionality of at least two in the isocyanate polyaddition reaction and having a molecular weight of from 32 to 300.

Suitable diisocyanates for producing the dispersed polyaddition products are, for example, ethylene diisocyanate, hexamethylene diisocyanate, 2,4-diisocyanatotoluene, 2,6-diisocyanatotoluene, 3,3,5-trimethyl-5-isocyanatomethyl cyclohexyl isocyanate or 4,4'-diisocyanatodiphenyl methane.

Suitable low molecular weight synthesis components containing isocyanate-reactive groups are, for example, hydrazine, ethylene diamine, hexamethylene diamine, 2,4-diaminotoluene, 2,6-diaminotoluene, 4,4'-diaminodiphenyl methane, aminoethanol, 2-aminopropanol, N,N-diethanolamine, ethylene glycol, trimethylene glycol, 1,2-propane diol, hexamethylene glycol, or even synthesis components containing ionic groups, such as the sodium salt of 2-(aminoethyl)-2-aminoethane sulfonic acid. The diisocyanates and synthesis components containing isocyanate-reactive groups exemplified above may also be used in the form of mixtures, in addition to which it is, of course, also possible to use synthesis components having a functionality of one or more in the isocyanate addition reaction. In the production of the polyaddition products, the synthesis components are generally used in such quantities that from 0.9 to 1.1, preferably 1, isocyanate group is available per isocyanate-reactive group. The dispersions of the polyaddition products in the polyhydroxyl compounds mentioned by way of example are generally produced in situ by known methods, for example those described in German Offenlegungsschrift 2,513,815; German Ausleguschrift 1,260,142 or in U.S. patent applications Ser. Nos. 740,450 and 740,454, all the disclosures of which are herein incorporated by reference.

In addition to the above-described dispersions of polyaddition products of low molecular weight synthesis components, it is also possible to use dispersions of which the polyaddition products have been produced from relatively high molecular weight synthesis components, "relatively high molecular weight" synthesis components being, for example, polyhydroxy polyesters or polyhydroxy polyethers of the synthesis components exemplified above and having a molecular weight of more than 300. Dispersions of such polyaddition products in the polyhydroxyl compounds mentioned by way of example may be obtained from the known aqueous polyurethane dispersions by mixing with the polyhydroxyl compounds and subsequently distilling off the water as described in U.S. patent applications 740,455 now U.S. Pat. No. 4,092,275 and 740,465, the disclosures of which are herein incorporated by reference.

Dispersions of polycondensation products in the polyhydroxyl compounds mentioned by way of example which are suitable are in particular, aminoplast dispersions of the type which may be obtained in known manner, for example as described in German Offenlegungsschrift 2,324,134, the disclosure of which is herein incorporated by reference.

The dispersions of polymers in the polyhydroxyl compounds mentioned by way of example which may also be used are, especially, dispersions of natural or synthetic rubber in the hydroxyl compounds mentioned by way of example, such as may be obtained from aqueous rubber latices in accordance with the principles of U.S. patent applications Ser. Nos. 740,455 and 740,465 by "dispersant exchange," i.e. by adding the polyhydroxyl compounds and distilling off the water.

Both the dispersions of isocyanate polyaddition products of low molecular weight units which are particularly preferred and also the dispersions of aminoplasts which may also be used are examples in which the disperse phase represents the component preferably synthesized from hard segments and thus responsible for the strength of cohesion, while the polyhydroxyl compound in such cases represents the elasticizing component. By contrast, in cases where dispersions of elastomeric polymers are used, the disperse phase represents the elasticizing component so that, by suitably selecting the polyhydroxyl compound, provision should be made for the formation of hard segments. Such provisions may be made by using comparatively more highly functional polyhydroxyl compounds as the continuous phase.

Polymer dispersions which are particularly preferred are polymer dispersions in polyhydroxyl compounds of which the disperse phase also contains isocyanate-reactive groups. The disperse phase should preferably contain at least 0.1 equivalent of reactive groups per 100 g of solids and should have a functionality of at least two in the isocyanate addition reaction.

Another important factor determining the suitability of the polymer dispersions is the particle size of the dispersed particles, the associated sedimentation stability and also the viscosity of the dispersions. In general, the particle size of the disperse phase should amount to from 0.01 to 10 $\mu$m, preferably from 0.01 to 1 $\mu$m. In addition, the dispersions are generally sedimentation-stable and, in the form of 20% solutions, have a viscosity at 25° C. below 100,000, preferably below 10,000 and, with particular preference, below 3000 cP.

Particularly finely divided dispersions are obtained by the above-mentioned prior art processes, by the process described in U.S. patent applications Ser. Nos. 740,455 and 740,465 or even by initially preparing a solution of the polymer in a low molecular weight alcohol, such as diethylene glycol, and subsequently mixing the resulting solution with a relatively high molecular weight polyol, preferably castor oil, the dissolved polymer changing into a finely disperse phase.

In the practical application, the polymer dispersions are reacted with organic polyisocyanates, for which purpose this reaction, which leads to polyurethanes, is either allowed to take place during the bonding process, i.e. the polyhydroxyl component and the polyisocyanate component are processed as a two-component system, or a prepolymer containing free isocyanate groups is initially prepared using an excess of polyisocyanate and is then processed as an adhesive which hardens under the influence of moisture. In the first case, the quantity of reactants is generally measured in such a way that for every isocyanate-reactive group present in the polymer dispersion there are from 0.8 to 1.5, preferably from 0.95 to 1.30, isocyanate groups. In the production of the NCO-prepolymers, from 1.2 to 2.5, preferably from 1.6 to 2.2, isocyanate groups are used per isocyanate-reactive group. However, in cases where an excess of isocyanate is used, there is no need to allow the reaction forming the NCO-prepolymer to take place before the bonding process is carried out. Instead it is possible, even where an excess of NCO is used, to carry out the isocyanate addition reaction between the polyisocyanate component and the polyhydroxyl component during the bonding process. Hardening of the system during the bonding process takes place partly through the reaction between the isocyanate groups of the isocyanate component and the isocyanate-reactive groups of the polyhydroxyl component and through the reaction between isocyanate groups of the isocyanate component and atmospheric moisture.

Suitable polyisocyanate components include aliphatic, cycloaliphatic, araliphatic, aromatic and heterocyclic polyisocyanates of the type described, for example, by W. Siefken in Justus Liebigs Annalen der Chemie, 562, pages 75 to 136, for example ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate, and mixtures of these isomers; 1-isocyanato-3,35-trimethyl-5-isocyanatomethyl cyclohexane (German Auslegeschrift 1,202,785); 2,4- and 2,6-hexahydrotolylene diisocyanate, and mixtures of these isomers; hexahydro-1,3- and/or 1,4-phenylene diisocyanate; perhydro-2,4'- and/or -4,4'-diphenyl methane diisocyanate; 1,3- and 1,4-phenylene diisocyanate; 2,4- and 2,6-tolylene diisocyanate, and mixtures of these isomers; diphenyl methane-2,4'- and/or -4,4'-diisocyanate; naphthylene-1,5-diisocyanate; triphenyl methane-4,4',4''-triisocyanate; polyphenyl polymethylene polyisocyanates of the type which may be obtained by condensing aniline with formaldehyde, followed by phosgenation, and which are described, for example, in British Pat. Nos. 874,430 and 848,671; perchlorinated aryl polyisocyanates of the type described, for example, in German Auslegeschrift 1,157,601; polyisocyanates containing carbodiimide groups of the type described in German Pat. No. 1,092,007; diisocyanates of the type described in U.S. Pat. No. 3,492,330; polyisocyanates containing allophanate groups of the type described, for example, in British Pat. No. 994,890, Belgian Pat. No. 761,626 and published Dutch Pat. application No. 7,102,524; polyisocyanates containing isocyanurate groups of the type described, for example, in German Pat. Nos. 1,022,789; 1,222,067 and 1,027,394 and in German Offenlegungsschriften 1,929,034 and 2,004,048; polyisocyanates containing urethane groups of the type described for example in Belgian Pat. No. 752,261 or in U.S. Pat. No. 3,394,164; polyisocyanates containing acylated urea groups as described in German Pat. No. 1,230,778; polyisocyanates containing biuret groups of the type described for example in German Pat. No. 1,101,394, in British Pat. No. 889,050 and in French Pat. No. 7,017,514; polyisocyanates obtained by telomerization reactions of the type described, for example, in Belgian Pat. No. 723,640; polyisocyanates containing ester groups of the type described, for example, in British Pat. Nos. 965,474 and 1,072,956, in U.S. Pat. No. 3,567,763 and in German Pat. No. 1,231,688; and reaction products of the above-mentioned isocyanates with acetals as described in German Pat. No. 1,072,385.

In general, it is particularly preferred to use the readily obtainable polyisocyanates containing aromatically bound isocyanate groups, such as 2,4-diisocyanatotoluene, 2,6-diisocyanatotoluene and mixtures of these isomers; 2,4'-diisocyanatodiphenyl methane, 4,4'-diisocyanatodiphenyl methane, and mixtures of these isomers; or phosgenation products of aniline/formaldehyde condensates of the type known as "polyisocyanate mixtures of the diphenyl methane series."

The dispersions essential to the present invention are preferably mixed with the polyisocyanate component at room temperature, in many cases using machines.

Even in cases where equivalent quantities of the reactants are used, the mixtures are liquids of relatively low viscosity over a period of from 0.2 to 30 hours, preferably from 0.1 to 1 hour, and may readily be applied to the materials to be bonded, for example using a brush or a two-component metering unit. After at least one of the surfaces to be bonded has been coated and the substrates to be bonded have been fitted together, the adhesive reaches maximum bond strength after only a short time. If desired, the reaction may even be accelerated by using known catalysts for accelerating the NCO/OH-reaction.

Suitable catalysts include, for example, tertiary amines such as triethylene diamine and N,N'-diethyl piperazine, or organometallic compounds, particularly tin compounds, such as dibutyl tin dilaurate. The catalysts are optionally added in quantities of from 0.01 to 5%, by weight, preferably from 0.1 to 3%, by weight, based on the reaction components.

For making bonds, the adhesives are generally applied to the substrates to be bonded at room temperature or slightly elevated temperature and the substrates to be bonded are subsequently pressed together. There is generally no need to apply elevated temperatures. In this connection, however, it is pointed out that it is also possible either to convert adhesives containing free isocyanate groups into derivatives containing masked isocyanate groups with the conventional masking agents for isocyanate groups, such as phenol or $\omega$-caprolactam, or to dimerize the free isocyanate groups of the prepolymers with the assistance of dimerization catalysts for isocyanate groups, such as tertiary phosphines. In both cases, heat-activatable adhesives whose isocyanate groups may only be released by the action of heat are obtained. In cases where such heat-activatable adhesives are processed, processing temperatures of up to 180° C. have to be applied. One application for which these heat-activatable adhesives containing dimerized isocyanate groups are particularly suitable is, for example, the bonding of tire cord.

The adhesives may be modified by the addition of natural or synthetic resins, anti-agers, pigments or fillers. It is also possible to use water-adsorbing substances, such as sodium aluminosilicate or solvents, such as methylethyl ketone, although there is generally no need for this in the case of the two-component adhesives.

Any materials, such as paper, textiles, plastics, rubber, metals or ceramic materials, may be bonded or joined by the method. The method is particularly suitable for bonding elastic materials because, by virtue of the elasticity inherent in the hardened adhesives, the elasticity of the composite material is not adversely affected.

EXAMPLES

"In-situ"-production of diisocyanate polyaddition product dispersions of Table 1 according to the teaching of U.S. patent application Ser. Nos. 740,451 and 740,452 (Dispersions I–XIV of Table 1) and U.S. patent application Ser. Nos. 740,450 and 740,454 (Dispersions XV and XVI of Table 1) (or German Offenlegungsschriften 2,550,796 and 2,550,797) in a polyol-water mixture.

GENERAL PROCEDURE

Apparatus: Stirrer-equipped steel vessel equipped with a reflux condenser followed by a descending condenser, storage vessel for the diisocyanate with an inlet pipe which dips into the liquid phase.

Carrying out the Polyaddition Reactions

A mixture of the dispersants (polyols), the NH-group-containing chain-extenders and water is introduced into the stirrer-equipped vessel. The water content, based on the quantity of dispersant, amounts to from 15%, by weight, for a 20% dispersion to 40%, by weight, for a 50%, by weight, dispersion. The liquid diisocyanate or isocyanate mixture is introduced with vigorous stirring into the mixture heated to from 70° to 85° C. by means of nitrogen under a pressure of approximately 0.5 bar. The diisocyanate may be added either continuously or in portions at such a rate that the heat of the exothermic polyaddition reaction heats the reaction mixture to the boiling temperature of the water. After the diisocyanate has been added, optionally while "boiling under reflux," the contents of the vessel are cooled to a temperature of from 50° to 75° C. and distillation of the water is commenced almost immediately under reduced pressure (from 500 to 300 Torr). After a vacuum of 40 Torr has been reached, the internal temperature is gradually increased to from 90° to 110° C. in order to remove the residue water. When the water content amounts to less than 0.2%, by weight, the still-hot dispersion may be let off through a 0.1 mm pressure filter.

The generally spherical particles of the stable dispersions have a diameter of from 0.1 to 2 μm, generally below 1 μm.

| Columns 5–7 | Starting components for the production of the disperse phase. | |
|---|---|---|
| Column 5 | DI = diisocyanate in %, by weight, based on solids. | |
| | T80 | 2,4- and 2,6-tolylene diisocyanate, 80:20 isomer mixture |
| | T100 | pure 2,4-tolylene diisocyanate |
| | MDI | 4,4′-diphenyl methane diisocyanate. |
| Column 6 | Chain-extender | |
| | HY | hydrazine (if used in monohydrate form, added in a correspondingly larger quantity). |
| | AA | ethanolamine |
| | DAA | N,N-diethanolamine |
| | MDA/DMS | N-methyl diethanolamine which as diisocyanate polyadduct is quaternized with 90 equivalent % of dimethyl sulfate. |

Table 1
Characterization of the dispersions produced "in situ" in dispersants containing ester and ether groups

| Dispersion 1 | Disperse Phase | | | | | Indices | | Dispersant 9 | % OH disp. 10 | Viscosity cP/25% 11 |
|---|---|---|---|---|---|---|---|---|---|---|
| | Type 2 | % OH 3 | Conc. 4 | DI 5 | Chain-extender 6 | NH 7 | NH + OH 8 | | | |
| | | | | | | | | 75 RIZ | 3.64 | 2600 |
| I | PHD | — | 25 | 21.1 T80 | 3.9 HY | 100 | — | 80 RIZ | 4.22 | 1400 |
| II | PHD(OH)$_2$ | 1.70 | 20 | 16.1 T80 | 2.7 HY | 100 | 90 | 50 PE 1 | 1.61 | 3200 |
| III | PHD(OH)$_2$ | 1.52 | 50 | 40.5 T80 | 6.7 HY + 2.8AA | 100 | 91 | 60 PE 2 | 1.66 | 1900 |
| IV | PHD(OH)$_2$ | 1.60 | 40 | 32.3 T80 | 5.4 HY + 2.3AA | 100 | 91 | 80 RIZ | 4.56 | 1300 |
| V | PHD(OH)$_2$ | 3.40 | 20 | 15.4 T80 | 2.2 HY + 2.4AA | 100 | 81.5 | 60 RIZ | 4.27 | 3200 |
| VI | PHD(PH)$_2$ | 3.40 | 40 | 30.7 T80 | 4.4 HY + 4.9AA | 100 | 81.5 | 60 PE 2 | 2.13 | 1200 |
| VII | PHD(OH)$_2$ | 2.78 | 40 | 31.3 T80 | 4.7 HY + 4.0AA | 100 | 84.6 | 75 RIZ | 7800 | 1200 |
| VIII | PHD(OH)$_2$ | 4.81 | 25 | 19.5 MDI | 1.4 HY + 4.1AA | 100 | 69.6 | 80 RIZ | 4.90 | 1200 |
| IX | PHD(OH)$_2$ | 5.10 | 20 | 14.6 I8C | 1.7 HY + 3.7AA | 100 | 73.7 | 60 PE 2 | 3.06 | 960 |
| X | PHD(OH)$_2$ | 5.10 | 40 | 29.2 T80 | 3.4 HY + 7.4AA | 100 | 73.7 | 75 RIZ | 5.15 | 1500 |
| XI | PHD(OH)$_2$ | 6.04 | 25 | 17.8 T80 | 1.8 HY + 5.4AA | 100 | 69.6 | 37.5 RIZ | | |
| XII | PHD(OH)$_2$ | 6.04 | 25 | 17.8 T80 | 1.8 HY + 5.4AA | 100 | 69.6 | | 3.97 | 1340 |
| XIII | PHD(OH)$_4$ | 1.70 | 20 | 16.1 T80 | 2.8 HY + 1.1DAA | 100 | 90 | 37.5 PE 1 | | |
| XIV | PHD(OH)$_4$ | 5.00 | 40 | 29.3 Tz0 | 4.5 HY + 6.2DAA 0.9 HY + 3.5AA | 100 | 74.1 | 80 RIZ 60 PE 2 | 4.22 3.02 | 1900 1500 |
| XV | PHD(OH)$_2$ | 4.75 | 20 | 14.0 T100 | 1.6 MDA/DMS | 100 | 66.3 | 80 RIZ | 4.83 | 1000 |
| XVI | APHS(OH)$_2$ | 5.31 | 20 | 14.0 T100 | 5.6 AAS + 3.8 AA | 100 | 66.0 | 80 RIZ | 4.94 | 3400 |

Explanation of Table 1

| Column 1 | Designation of the dispersions used as starting component for the mixed adhesive. |
|---|---|
| Column 2 | Classification of the disperse phase |
| | PHD — polyhydrazodicarbonamide |
| | PHD(OH)$_x$ — polyhydrazodicarbonamide having x hydroxyl groups in the molecule |
| | KPHD(OH)$_x$ — cationic PHD having x hydroxyl groups in the molecule |
| | APHS(OH)$_x$ — anionic polyurea having x hydroxyl groups in the molecule |
| Column 3 | Hydroxyl group content in %, by weight, based on solids. |
| Column 4 | Conc. = solids content in %, by weight. |
| Columns 7 and 8 | Indices |
| Column 7 | $KZ_{NH} = \dfrac{NCO}{NH} \cdot 100$ |
| Column 8 | $KZ_{NH/OH} = \dfrac{NCO}{NH} + OH \cdot 100$ |
| Column 9 | Dispersants |
| | RIZ = castor oil, OH-number 165 |
| | PE 1 = linear polypropylene glycol having secondary OH-groups (OH-number = 56) |
| | PE 2 = linear 1,2-propane diol-started polyether of propylene oxide and ethylene oxide containing approximately 6% of primary OH-groups, OH-number 56. |
| Column 10 | Hydroxyl group content in %, by weight, based on the dispersion as a whole. |
| Column 11 | Viscosity of the dispersion (25%) in cP. |

Table 2
Composition and properties of the mixed adhesives used in the method according to the invention

| Examples 1 | Dispersion (Table 1) | | | | Dispersant 6 | Polyisocyanate 7 | Addition % disp. 8 |
|---|---|---|---|---|---|---|---|
| | Desig. 2 | Type 3 | % OH 4 | Conc. 5 | | | |
| 1 | I | PHD | — | 25 | RIZ | 37.5 V | — |
| 2 | II | PHD(OH)$_2$ | 1.70 | 20 | RIZ | 47.0 V | — |
| 3 | III | PHD(OH)$_2$ | 1.52 | 50 | PE 1 | 16.6 V | — |
| 4 | " | " | " | " | " | " | 0.3 K1 |

Table 2-continued
Composition and properties of the mixed adhesives used in the method according to the invention

| | | | | | | | |
|---|---|---|---|---|---|---|---|
| 5 | IV | PHD(OH)₂ | 1.60 | 40 | PE 2 | 17.1 V | — |
| 6 | " | " | " | " | " | " | 0.3 K2 |
| 7 | V | PHD(OH)₂ | 3.40 | 20 | RIZ | 47.0 V | — |
| 8 | VI | PHD(OH)₂ | 2.78 | 40 | RIZ | 47.0 V | — |
| 9 | VII | PHD(OH)₂ | 2.78 | 40 | PE 2 | 22.0 V | — |
| 10 | VIII | PHD(OH)₂ | 4.81 | 25 | RIZ | 50.0 V | — |
| 11 | IX | PHD(OH)₂ | 5.10 | 20 | RIZ | 51.0 V | — |
| 12 | X | PHD(OH)₂ | 5.10 | 40 | PE 2 | 31.5 V | — |
| 13 | XI | PHD(OH)₂ | 6.04 | 25 | RIZ | 53 V | — |
| 14 | " | " | " | " | " | 123 L | — |
| 15 | " | " | " | " | " | 49.5 V | 10 PE 2 |
| 16 | XII | PHD(OH)₂ | 6.04 | 25 | RIZ1/PEZ1 = 1/1 | 40.9 V | — |
| 17 | XIII | PHD(OH)₂ | 1.70 | 20 | RIZ | 43.5 V | — |
| 18 | XIV | PHD(OH)₂ | 5.00 | 40 | PE 2 | 22.0 V | — |
| 19 | XV | KPHD(OH)₂ | 4.75 | 20 | RIZ | 49.9 V | — |
| 20 | XVI | APHS(OH)₂ | 5.31 | 20 | RIZ | 51.0 V | — |

| | | Properties | | | | |
|---|---|---|---|---|---|---|
| | | Shear strength kp/cm² | | Thermal stability under load 50° C. | | |
| Examples | Pot-life | Immediately | After 9 days | mins. | cm | Remarks |
| 1 | 9 | 10 | 11 | 12 | 13 | 14 |
| 1 | 39' | 62 | 76 | 64 | | |
| 2 | 31' | 65 | 85 | 75 | | |
| 3 | >24 h | 15 | 50 | 180 | 2 | |
| 4 | 5 h | 25 | 68 | 180 | 1 | |
| 5 | >24 h | 24 | 52 | 180 | 4 | |
| 6 | 3 h | 31 | 71 | 180 | 2 | |
| 7 | 31' | 73 | 105 | 120 | | |
| 8 | 34' | 61 | 96 | 180 | 2 | |
| 9 | >24 h | 27 | 77 | 180 | 4 | |
| 10 | 39' | 85 | 115 | 180 | 1 | |
| 11 | 30' | 68 | 114 | 180 | 2 | |
| 12 | >24 h | 32 | 80 | 180 | 2 | |
| 13 | 33' | 88 | 110 | 180 | 0 | |
| 14 | >18 h | 62 | 95 | 180 | 4 | |
| 15 | 40' | 71 | 132 | 180 | 5 | 22.7% disp. |
| 16 | 3.5 h | 45 | 53 | 120 | | |
| 17 | 32' | 58 | 84 | 95 | | |
| 18 | >24 h | 22 | 77 | 180 | 2 | |
| 19 | 33' | 33 | 70 | 150 | | |
| 20 | 22' | 45 | 82 | 160 | | |

Table 3

| | | | | | Comparison tests with the pure dispersants | | | | | | | | |
|---|---|---|---|---|---|---|---|---|---|---|---|---|---|
| 1 | 2 | 3 | 4 | 5 | 6 | 7 | 8 | 9 | 10 | 11 | 12 | 13 | 14 |
| A | — | — | — | — | RIZ | 51 V | — | 38' | 37 | 49 | 23 | — | |
| B | — | — | — | — | PE 1 | 17.5 V | — | 24 h | — | — | — | — | no film formation |
| C | — | — | — | — | PE 2 | 17.5 V | — | 24 h | — | — | — | — | no film formation |

Explanation of Tables 2 and 3

| | |
|---|---|
| Column 1 | Designation of the Examples. |
| Columns 2–6 | Characterization of the dispersion in polyols; cf. Table 1, columns 1 to 4 and 10. |
| Column 7 | Polyisocyanates in %, by weight, based on the dispersions designated in column 2, which are intensively mixed with the dispersion at room temperature. |
| | V = polyphenyl polymethylene polyisocyanate having an NCO-content of 30%, by weight ("crude MDI") |
| | L = tris-(urethane-isocyanate) of 1 mol of 1,1,1-trimethylol propane and 2,4-tolylene diisocyanate in the form of a 75% ethyl acetate solution, NCO-content = 14.2%, by weight. |
| Column 8 | Additions in %, by weight, based on the dispersions of column 2, K 1 = diazabicyclooctane K 2 = tin dioctoate |
| | PE2 = polyether glycol, cf. Table 1, column 10. |
| Column 9 | Pot-lives (coatability times) ' = minutes h = hours. |
| Columns 10 and 11 | |

Testing of shear strength

Shear strength is tested in accordance with DIN 53 251. For this test, non-pre-treated beechwood test specimens are coated with adhesive. 15 minutes after the adhesive has been applied, two test specimens are fitted together in such a way as to give an overlapped surface of 2 cm² and are then pressed for 24 hours under a pressure of 30 kp/cm². Shear strength is determined in a tensile testing machine with a spindle advance of 110 mm/minute.

This test is carried out immediately and also 9 days after pressing.

Columns 12 and 13

Testing of thermal stability under load

Thermal stability under load is tested on a composite material of non-pre-treated beechwood and a 0.25 mm thick decorative PVC film (manufacturer: Benecke, order No.: 387913) with a phthalate plasticizer content of 15%. Both test materials are coated with adhesive and, after an "open time" of 15 minutes, are fitted together in such a way as to give an over lapped surface of 5×6 cm. The composite material is then pressed for 1 minute under a pressure of 3.5 kg/cm. After storage for 9 days, the composite material is exposed to a constant force of 1.250 kp over a width of 5 cm at temperatures of 50° C. The separation angle is 180° C. The preceding Table shows the times for which the bond withstands the load. After 180 minutes, the test was terminated and the separation length measured in cm.

20% PHD (OH)$_2$/SAN-dispersion XVII

Solids ratio: 1:1
Dispersant: castor oil; OH-number 165
OH-number/solids=3.02%, by weight; viscosity at 25° C. 1900 cP
Particle size: 0.5 to 3 μm.

The dispersion is produced in accordance with U.S. Patent Application 804,843 (or German Offenlegungsschrift 2,627,073) and the general procedure, except that instead of pure water, an aqueous styrene-acrylonitrile dispersion (ratio by weight, of styrene to acrylonitrile 72:28) is stirred into the initial mixture. Otherwise, the procedure is as for Example XI, Table 1.

EXAMPLE 21

100 parts, by weight, of dispersion XVII and 47.1 parts, by weight, of polyisocyanate V are stirred intensively at room temperature and applied as a mixed adhesive. Its pot-life is 47 minutes.

|  | Immediately | After 9 days |
|---|---|---|
| Shear strength kp/cm$^2$ | 51 | 72 |
| Thermal stability under load at 50° C. |  | 95 minutes |
| 25% PHD(OH)$_2$/ABS-dispersion XVIII |  |  |

25% PHD(OH)$_2$/ABS-dispersion XVIII

Solids ratio 1:1
Hydroxyl group content 3.02%, by weight, based on solids
Dispersant: Castor oil; OH-number 165
Viscosity at 25° C.; 3200 cP
Particle size 0.1 to 1 μm.

The dispersion is produced in the same way as dispersion XVII, except that an aqueous ABS (graft copolymer) dispersion of 70%, by weight, of styrene-acrylonitrile copolymer and 30%, by weight, of graft copolymer of butadiene, styrene and acrylonitrile is used instead of an SAN-dispersion.

EXAMPLE 22

The mixed adhesive produced with polyisocyanate V in accordance with Example 21 has a pot-life of 40 minutes

|  | Immediately | After 9 days |
|---|---|---|
| Shear strength kp/cm$^2$ | 84 | 105 |
| Thermal stability under load at 50° C. |  | 155 minutes |

25% ABS-dispersion XIX

Dispersant: castor oil, OH-number 165
Viscosity at 25° C.: 2300 cP
Particle size 0.2 to 1 μm The dispersion is prepared by replacing the water of a 33% aqueous ABS-dispersion with the corresponding quantity of castor oil, initially introducing the organic phase and heating to 50° C. The aqueous ABS-dispersion is slowly introduced while stirring and at the same time the water is continuously distilled off under reduced pressure.

EXAMPLE 23

The mixed adhesive produced from 100 parts, by weight, of dispersion XIX and 37.5 parts, by weight, of polyisocyanate V has a pot-life of 33 minutes.

|  | Immediately | After 9 days |
|---|---|---|
| Shear strength kp/cm$^2$ | 78 | 95 |
| Thermal stability under load at 50° C. |  | 120 minutes. |

Comparison Example D for Examples 22 and 23

If dispersion XIX is replaced by a polymer powder obtained in the conventional way from the same aqueous ABS-polymer, the powder suspended in castor oil to form a 25% suspension and the resulting suspension mixed with the same quantity of polyisocyanate V, a mixture is obtained which is just as unsuitable as a mixed adhesive as pure castor oil (see Comparison Example A, Table 3).

25% PHD(OH)$_2$/PMHS-dispersion XX

Solids ratio: 1:1
Dispersant: castor oil
OH-number/solids=3.02%, by weight
Viscosity at 25° C.: 2350 cP
Particle size: 0.2 to 2 μm.

The dispersion is produced in accordance with Example 6 of U.S. patent application No. 829,363 (or German Offenlegungsschrift 2,639,254) by polyaddition and polycondensation reactions carried out simultaneously in situ in castor oil. The components mentioned in Table 1, dispersion IX, are used as starting components for the polyadduct, while urea and formaldehyde in a molar ratio of 1:1 are used as starting components for the polycondensate giving the polymethylene urea (PMHS).

EXAMPLE 24

The mixture produced from 100 parts, by weight, of dispersion XIX and 37.5 parts, by weight, of polyisocyanate V has a pot-life of 34 minutes.

|  | Immediately | After 9 days |
| --- | --- | --- |
| Shear strength kp/cm² | 42 | 63 |
| Thermal stability under load at 50° C. |  | 23 minutes. |

25% PMHS(CH₃—OH)ₓ-dispersion XXI

Dispersant: castor oil
Viscosity at 25° C.: 2800 cP
Particle size: 0.5 to 3 μm

The polycondensate dispersion containing terminal methylol groups is produced from urea and formaldehyde in a molar ratio of 19:20 as described in U.S. patent application No. 464,099 (or German Offenlegungsschrift 2,324,134).

EXAMPLE 25

The mixture obtained from 100 parts, by weight, of dispersion XXI and 41 parts, by weight, of polyisocyanate V has a pot-life of 21 minutes.

|  | Immediately | After 9 days |
| --- | --- | --- |
| Shear strength kp/cm² | 61 | 80 |
| Thermal stability under load at 50° C. |  | 125 minutes. |

EXAMPLE 26

100 parts, by weight, of a mixture of equal parts of the 25% dispersions XI and XXI and 47 parts, by weight, of polyisocyanate V have a pot-life of 26 minutes.

|  | Immediately | After 9 days |
| --- | --- | --- |
| Shear strength kp/cm² | 78 | 102 |
| Thermal stability under load at 50° C. |  | 180 minutes/2 cm. |

6% PHD(OH)₂-dispersion XXII

Dispersant mixture: diethylene glycol/castor oil in a ratio,
by weight, of 9:85.
OH-number/solids 5.74%, by weight
Viscosity at 25° C.
Particle size: 0.05 to 1 μm.

(a) Production of a 40% PHD(OH)₂-solution in diethylene glycol as described in U.S. Patent Application 827,292 (or German Offenlegungsschrift 2,638,759) from 23.5 parts, by weight of 2,4-tolylene diisocyanate, 2.2 parts, by weight, of hydrazine (used as monohydrate) and 14.3 parts, by weight, of diethylene glycol in excess diethylene glycol. The anhydrous solution has a viscosity of 3100 cP at 25° C.

(b) Dispersion of solution (a) in castor oil: 85 parts, by weight, of castor oil are introduced into a stirrer-equipped apparatus and heated to 60° C. 15 parts, by weight, of a diethylene glycol solution heated to 70° C. are then slowly introduced with intensive stirring and the clear dispersion is allowed to cool to room temperature.

EXAMPLE 27

100 parts, by weight, of dispersion XXII and 75 parts, by weight, of polyisocyanate are intensively mixed. The pot-life amounts to 20 minutes.

|  | Immediately | After 9 days |
| --- | --- | --- |
| Shear strength kp/cm² | 69 | 80 |
| Thermal stability under load at 50° C. |  | 180 minutes/4 cm. |

40% PHD(OH)₂-suspension XXIII

Dispersant: polyalkylene oxide PE 2 (Table 1)
OH-number/solids 5.10%, by weight,
Viscosity at 25° C.: 970 cP
Particle size: 1 to 5 μm.

(a) Production of a PHD(OH)₂-powder:

The polyaddition reaction is carried out in analogy to dispersion X (Table 1) using the same reaction components and quantities, but solely in water. After the diisocyanate has been completely consumed, the polyadduct may be isolated on a suction filter and, after thorough washing, may be dried in vacuo on a plate in a drying cabinet at from 80° to 120° C. A powder of irregular granulometry (particle diameter from 2 to 6 μm) is obtained after 25 hours in a ball mill.

(b) Suspension of the powder:

60 parts, by weight, of PE 2 and 40 parts, by weight, of the powder described in (a) are intensively mixed until the suspension is free from agglomerates. A from 60 to 70% master batch obtained on a three-roll stand may optionally be diluted to a solids content of 40%.

EXAMPLE 28

A mixture having a pot-life of more than 24 hours is produced as in Example 12 using excess polyisocyanate V.

|  | Immediately | After 9 days |
| --- | --- | --- |
| Shear strength kp/cm² | 42 | 71 |
| Thermal stability under load at 50° C. |  | 75 minutes |

Without PHD(OH)₂-powder, there is no film formation (comparison test C, Table 3).

EXAMPLE 29

Production of a storable NCO-prepolymer dispersion:

100 parts, by weight, of a 40% PHD(OH)₂-dispersion in PE 2 (see Example X, Table 1) and 6 parts, by weight, of N-methyl diethanolamine are heated to 80° C. in a stirrer-equipped apparatus, followed by the introduction of 40.24 parts, by weight, of a diphenyl methane-4,4'-diisocyanate heated to 250° C. Substantially the theoretical content of free isocyanate of 3.9% by weight, is obtained in from 3 to 5 hours at a reaction temperature of from 95° to 105° C.

The viscosity amounts to 27,500 cP at 80° C.

In the absence of moisture, the product is stable in storage at room temperature.

Bonding properties:

The mixture has a pot-life in air of about 3 hours.

|  | Immediately | | After 9 days | |
|---|---|---|---|---|
|  | (a) | (b) | (a) | (b) |
| Shear strength kp/cm² | 28 | 54 | 64 | 87 |
| Thermal stability under load at 50° C./minutes |  |  |  | 180 |

(a) = no addition;
(b) = with 2%, by weight, of 1,4-butane diol.

What is claimed is:

1. In a method for bonding one or more substrates with polyurethane adhesives comprising:
   (A) applying to at least one of the surfaces to be bonded adhesives comprising organic polyisocyanates and compounds containing isocyanate-reactive hydrogen atoms which react with each other to form polyurethanes, or moisture-hardening reaction products containing free isocyanate groups or excess quantities of polyisocyanates and compounds containing isocyanate-reactive hydrogen atoms which react with each other and
   (B) fitting together said surfaces to be bonded, the improvement wherein said compounds containing isocyanate-reactive hydrogen atoms are dispersions of isocyanate polyaddition products which contain terminal hydroxyl groups and primary or secondary amino groups or semicarbazide groups, in organic polyhydroxyl compounds, prepared from diisocyanates having a molecular weight of from 112 to 300 and compounds containing isocyanate-reactive groups having a functionality of at least two and a molecular weight of from 32 to 300.

2. The method of claim 1, wherein said diisocyanates of said low molecular weight units are selected from the group consisting of 2,4-diisocyanatotoluene, 2,6-diisocyanatotoluene, ethylene diisocyanate, hexamethylene diisocyanate, 3,3,5-trimethyl-5-isocyanatomethyl cyclohexyl isocyanate, 4,4'-diisocyanatodiphenyl methane, and mixtures thereof.

3. The method of claim 1, wherein said isocyanate-reactive groups of said low molecular weight units are selected from the group consisting of hydrazine, ethylene diamine, hexamethylene diamine, 2,4-diaminotoluene, 2,6-diaminotoluene, 4,4'-diaminodiphenyl methane, aminoethanol, 2-aminopropanol, N,N-diethanolamine, ethylene glycol, trimethylene glycol, 1,2-propane diol, hexamethylene glycol, and mixtures thereof.

4. The method of claim 1, wherein said organic polyhydroxyl compounds have a molecular weight from 200 to 4,000.

5. The method of claim 4, wherein said organic polyhydroxyl compounds have a molecular weight from 400 to 2,500.

6. The method of claim 1, wherein said organic polyhydroxyl compounds are mixtures of different polyhydroxyl compounds having an average molecular weight of from 200 to 4,000 and the individual organic polyhydroxyl compounds have molecular weights from 62 to 20,000.

7. The method of claim 6, wherein said mixtures of different polyhydroxyl compounds have an average molecular weight of 400 to 2,500.

8. The method of claim 1, wherein said organic polyhydroxyl groups are selected from the group consisting of polyhydric alcohols, polyether polyols, and natural oils containing hydroxyl groups.

9. The method of claim 1, wherein said dispersions have a solids content of from 3 to 60%, by weight, based on the dispersion as a whole.

10. The method of claim 9, wherein said solids content is 10 to 50%.

11. The method of claim 1, wherein said dispersions are sedimentation-stable and are in the form of 20% solutions having a viscosity at 25° C. below 100,000 cP.

12. The method of claim 11, wherein the dispersed particles have a size of from 0.01 to 10 μm.

13. The method of claim 1, wherein said organic polyisocyanates are selected from the group consisting of 2,4-diisocyanatotoluene, 2,6-diisocyanatotoluene, and mixtures thereof.

14. The method of claim 1, wherein said organic polyisocyanates are selected from the group consisting of 2,4'-diisocyanatodiphenyl methane, 4,4'-diisocyanatodiphenyl methane, and mixtures thereof.

* * * * *